(12) United States Patent
Gong et al.

(10) Patent No.: US 8,811,044 B2
(45) Date of Patent: Aug. 19, 2014

(54) POWER SUPPLY DEVICE, CONTROL INTEGRATED CIRCUIT THEREOF, AND METHOD OF CONTROLLING POWER SUPPLY DEVICE

(75) Inventors: Jung Chul Gong, Seoul (KR); Hwan Cho, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 308 days.

(21) Appl. No.: 13/288,707

(22) Filed: Nov. 3, 2011

(65) Prior Publication Data

US 2012/0306461 A1 Dec. 6, 2012

(30) Foreign Application Priority Data

Jun. 1, 2011 (KR) .................. 10-2011-0052898

(51) Int. Cl.
*H02M 3/335* (2006.01)

(52) U.S. Cl.
USPC .................. 363/21.16; 363/21.07

(58) Field of Classification Search
USPC ........ 363/21.03, 21.08, 21.12, 34, 39, 89, 97, 363/21.07; 323/222, 282–290, 207, 271, 323/244, 246
See application file for complete search history.

(56) References Cited

U.S. PATENT DOCUMENTS 6,329,882 B1 * 12/2001 Fayneh et al. ............ 331/10
6,437,997 B1 * 8/2002 Inarida et al. ............ 363/37
7,199,565 B1 * 4/2007 Demolli .................. 323/273
7,746,672 B2 * 6/2010 Nishikawa .............. 363/21.16
8,184,419 B2 * 5/2012 Peng ....................... 361/93.9

FOREIGN PATENT DOCUMENTS

JP 2006-099950 4/2006

OTHER PUBLICATIONS

TEA 1793T Data Street. "GreenChip SMPS standby control IC" Apr. 28, 2011.*
Korean Office Action, and English translation thereof, issued in Korean Patent Application No. 10-2011-0052898 dated Aug. 30, 2012.
TEA 1703T Data Sheet. "GreenChip SMPS standby control IC." Apr. 28, 2011.

* cited by examiner

*Primary Examiner* — Rajnikant Patel
(74) *Attorney, Agent, or Firm* — McDermott Will & Emery LLP (57) ABSTRACT

There is provided a power supply device including: a first controller operating a pulse width modulation (PWM) control integrated circuit (IC) when a load is connected to an output terminal thereof; a second controller determining whether to operate the PWM control IC according to a change in voltage of an auxiliary capacitor connected to the first controller when a load is not connected to the output terminal; and a constant voltage circuit unit supplying a constant voltage to the first controller and the second controller when the PWM control IC operates. Power consumption can be considerably reduced when a load is not connected to the output terminal of the power supply device. Also, since elements for controlling the power supply device are implemented as a single integrated circuit (IC), a leakage current can be reduced to thus minimize power consumption. In addition, voltage can be supplied to the IC while reducing switching noise.

17 Claims, 5 Drawing Sheets

FIG. 5

POWER SUPPLY DEVICE, CONTROL INTEGRATED CIRCUIT THEREOF, AND METHOD OF CONTROLLING POWER SUPPLY DEVICE

CROSS-REFERENCE TO RELATED APPLICATIONS

This application claims the priority of Korean Patent Application No. 10-2011-0052898 filed on Jun. 1, 2011, in the Korean Intellectual Property Office, the disclosure of which is incorporated herein by reference.

BACKGROUND OF THE INVENTION

1. Field of the Invention

The present invention relates to a power supply device for reducing power consumption when a load is not connected to an output terminal thereof, a control integrated circuit (IC), and a method of controlling a power supply device.

2. Description of the Related Art

In general, a switching mode power supply (SMPS) that satisfies the requirements of small size and high efficiency is commonly used as a power supply device. Such a power supply device may be used for an adapter, an external power device of a notebook computer, a liquid crystal display (LCD) monitor, an audio device, or the like.

In order to reduce power consumption when a load is not connected to an output terminal, the related art power supply device employs a burst scheme in which performing a switching operation and stopping the switching operation are repeated, respectively, for a certain period of time through feedback, in a case of a light load.

However, the related art power supply device using the burst scheme has a limitation in coping with regulated power consumption levels which are becoming stricter.

Also, in the related art power supply device, respective elements of a controller are distributed, having limitations in reducing power consumption, and when voltage is supplied to the controller, the voltage of the output terminal of the power supply device is used directly, causing switching noise introduced to the controller.

SUMMARY OF THE INVENTION

An aspect of the present invention provides a power supply device capable of significantly reducing power consumption when a load is not connected to an output terminal, while uniformly maintaining an output voltage, and a control IC, and a method of controlling a power supply device.

According to an aspect of the present invention, there is provided a power supply device including: a first controller operating a pulse width modulation (PWM) control IC when a load is connected to an output terminal of the power supply device; a second controller determining whether to operate the PWM control IC according to a change in voltage of an auxiliary capacitor connected to the first controller when the load is not connected to the output terminal; and a constant voltage circuit unit supplying a constant voltage to the first controller and the second controller when the PWM control IC operates.

When the constant voltage generated from the voltage of the output terminal is higher than a reference voltage value, the voltage of the output terminal supplied to the constant voltage circuit unit may be cut off.

The constant voltage circuit unit may include: a band gap reference circuit unit generating a reference voltage from the voltage of the output terminal; a low voltage drop regulator generating a constant voltage upon receiving the reference voltage from the band gap reference circuit unit; and a voltage cutoff unit cutting off voltage of the output terminal supplied to the band gap reference circuit unit when the constant voltage is higher than the reference voltage value.

When the voltage of the output terminal is cut off, the voltage cutoff unit may provide the constant voltage generated by the low voltage drop regulator to the band gap reference circuit unit.

The power supply device may further include: a third controller controlling the PWM control IC such that the voltage of the output terminal is uniformly maintained when the load is connected to the output terminal.

When the voltage of the auxiliary capacitor becomes lower than the reference voltage value, the second controller may operate the PWM control IC.

The power supply device may further include: a voltage detection unit detecting a voltage changing according to whether or not the load is connected to the output terminal, and providing the detected voltage to the first controller.

The voltage detection unit may include: a first resistor connected between the first controller and the constant voltage circuit unit; and a second resistor connected between the output terminal and a ground.

The first controller may include: a third resistor, a fourth resistor, and a fifth resistor connected in series between the output terminal of the constant voltage circuit unit and the load; and a second comparator having an inversion terminal connected to a connection node of the fourth resistor and the fifth resistor and a non-inversion terminal connected to the voltage detection unit.

The second controller may include: a first comparator having a non-inversion terminal connected to a connection node of the third resistor and the fourth resistor and an inversion terminal receiving a reference voltage.

The voltage cutoff unit may include: an eighth resistor having one end connected to the output terminal of the power supply device; a first n channel metal oxide semiconductor field effect transistor (MOSFET) having a gate connected to the other end of the eighth resistor, a drain connected to one end of the eighth resistor, and a source connected to the band gap reference circuit unit; a first diode having a cathode connected to the other end of the eighth resistor and the gate of the first n channel MOSFET, and an anode connected to the band gap reference circuit unit and the source of the first n channel MOSFET; a second n channel MOSFET having a drain connected to the other end of the eighth resistor and a source connected to the load; a ninth resistor and a tenth resistor connected in series between the anode of the first diode and the load; and a p channel MOSFET having a drain connected to a gate of the second n channel MOSFET, a gate connected to the load, and a source connected to a connection node of the ninth resistor and the tenth resistor.

According to another aspect of the present invention, there is provided a control integrated circuit (IC) including: a first controller outputting a low signal when a load is connected to an output terminal of a power supply device; a second controller outputting a low signal lower than a pre-set voltage value when the voltage of an auxiliary capacitor connected to the first controller becomes lower than the reference voltage value when the load is not connected to the output terminal of the power supply device; and a constant voltage circuit unit supplying a constant voltage to the first controller and the second controller, wherein when any one of an output from the first controller and an output from the second controller is a low signal, a pulse width modulation (PWM) control IC is operated.

When the constant voltage generated from the voltage of the output terminal is higher than the reference voltage value, the voltage of the output terminal supplied to the constant voltage circuit unit may be cut off.

The constant voltage circuit unit may include: a band gap reference circuit unit generating a reference voltage from the voltage of the output terminal; a low voltage drop regulator generating a constant voltage upon receiving the reference voltage from the band gap reference circuit unit; and a voltage cutoff unit cutting off the voltage of the output terminal supplied to the band gap reference circuit unit when the constant voltage is higher than the reference voltage value.

When the voltage of the output terminal is cut off, the voltage cutoff unit may provide the constant voltage generated by the low voltage drop regulator to the band gap reference circuit unit.

According to another aspect of the present invention, there is provided a method of controlling a power supply device, including: determining whether or not a load is connected to an output terminal of the power supply device; operating, by a first controller, a pulse width modulation (PWM) control integrated circuit (IC) when the load is connected to the output terminal; determining, by a second controller, whether to operate the PWM control IC according to a change in voltage of an auxiliary capacitor connected to the first controller when the load is not connected to the output terminal; and supplying a constant voltage to the first controller and the second controller through a constant voltage circuit unit when the PWM control IC is operated.

In the supplying of the constant voltage, when the constant voltage generated from a voltage of the output terminal is higher than a reference voltage value, the voltage of the output terminal may be cut off.

The supplying of the constant voltage may include: generating a reference voltage from the voltage of the output terminal; generating a constant voltage upon receiving the reference voltage; and cutting off the voltage of the output terminal when the generated constant voltage is higher than the reference voltage value.

When the voltage of the output terminal is cut off, the reference voltage may be generated from the constant voltage.

In the determining, by the second controller, of whether to operate the PWM control IC, when the voltage of the auxiliary capacitor becomes lower than the reference voltage value, the second controller may operate the PWM control IC.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings.

The present invention may, however, be embodied in many different forms, and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 1:
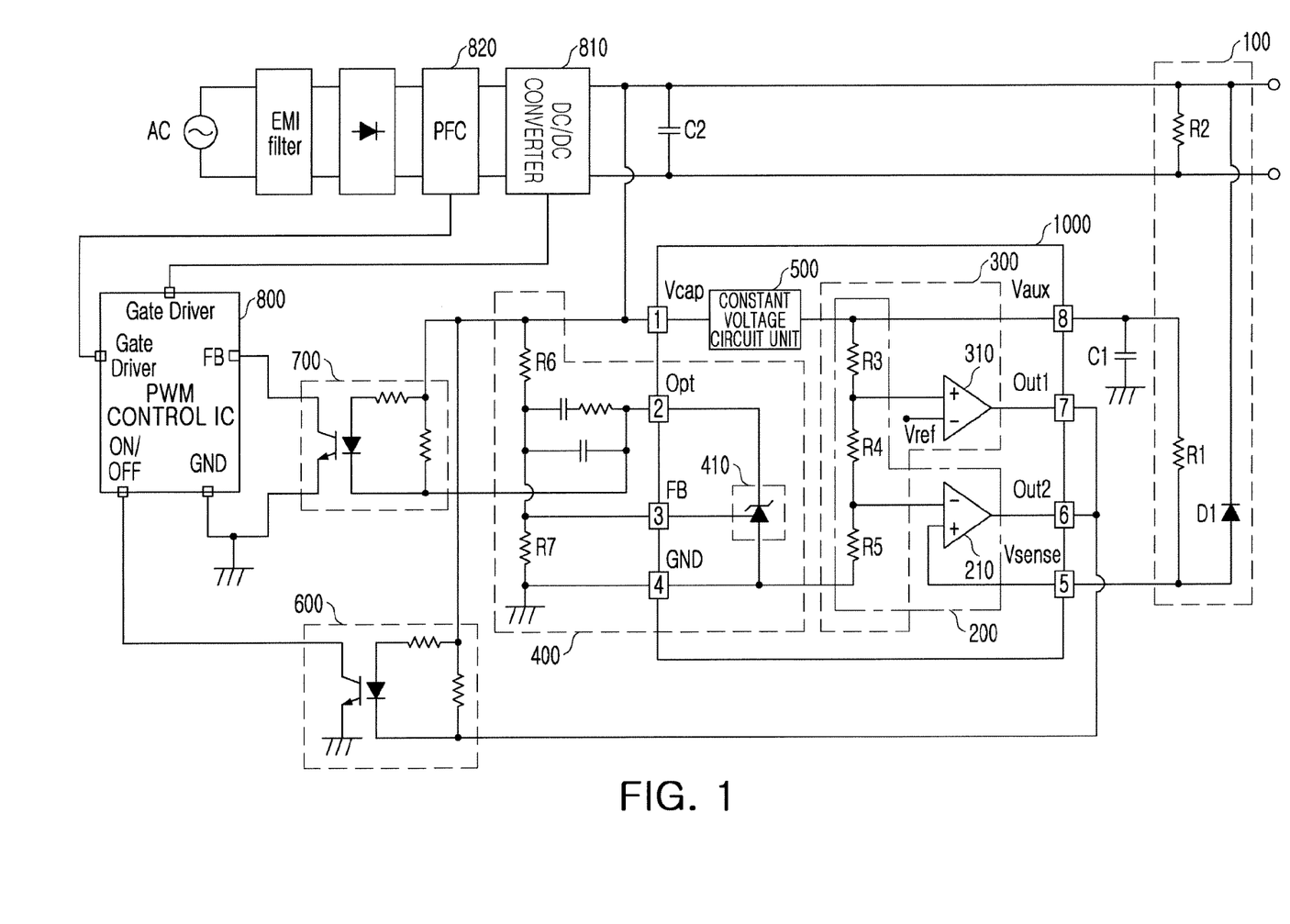
FIG. 1 is a detailed block diagram of a power supply device according to an embodiment of the present invention.

FIG. 1 is a detailed block diagram of a power supply device according to an embodiment of the present invention.

Referring to FIG. 1, a power supply device according to an embodiment of the present invention may include a voltage detection unit 100, a first controller 200, a second controller 300, a constant voltage circuit unit 500, a third controller 400, an auxiliary capacitor C1, a first signal transmission unit 600, and a second signal transmission unit 700.

Here, an electromagnetic interference (EMI) filter, a rectifying unit, a power factor corrector (PFC) 820, and a DC/DC converter 810 illustrated in FIG. 1 include a configuration which can be generally used in a power supply device, so a detailed description thereof will be omitted.

The voltage detection unit 100 detects a voltage that changes according to whether or not the load is connected to an output terminal of the power supply device, and provides the detected voltage to the first controller 200. Here, the voltage detection unit 100 may include a first resistor R1 connected between the first controller 200 and the constant voltage circuit unit 500 and a second resistor R2 connected between the output terminal and a ground.

When a load is connected to the output terminal of the power supply device, the first controller 200 may operate a pulse width modulation (PWM) control integrated circuit (IC) 800. Here, the first controller 200 may include a third resistor R3, a fourth resistor R4, and a fifth resistor R5 connected in series between an output terminal of the constant voltage circuit unit 500 and a ground, and a second comparator 210 having an inversion terminal connected to a connection node of the fourth resistor R4 and the fifth resistor R5 and a non-inversion terminal connected to the voltage detection unit 100.

When a load is not connected to the output terminal of the power supply device, the second controller 300 may determine whether to operate the PWM control IC 800. Namely, when a voltage Vaux of the auxiliary capacitor C1 becomes lower than a reference voltage value Vref, the second controller 300 may operate the PWM control IC 800. Here, the second controller 300 may include a first comparator 310 having a non-inversion terminal connected to a connection node of the third resistor R3 and the fourth resistor R4 and an inversion terminal receiving a reference voltage. The third resistor R3 and the fourth resistor R4 are the same as those of the first controller 200. Namely, the first controller 200 and the second controller 300 may share the resistors R3 and R4.

When a load is connected to the output terminal of the power supply device, the third controller 400 may control the PWM control IC 800 in order to uniformly maintain the voltage of the output terminal. Here, the third controller 400 may include a sixth resistor R6 and a seventh resistor R7 connected in series between an output terminal and a ground, a parallel capacitor connected between the sixth resistor R6 and the seventh resistor R7, and a shunt regulator 410 connected to the parallel capacitor, a connection node of the sixth resistor R6 and the seventh resistor R7 and a ground.

The first signal transmission unit 600 may include a first photocoupler connected to an output OUT1 of the second controller 300 and an output OUT2 of the first controller 200, and the output terminal of the power supply device. The first photocoupler may be connected to an ON/OFF terminal of a primary PWM control IC 800 of the power supply device.

The second signal transmission unit 700 may include a second photocoupler connected to the output terminal of the power supply device and the third controller 400. The second photocoupler may be connected to an FB terminal of the primary PWM control IC 800 of the power supply device.

The PWM control IC 800 may adjust a switching duty of the PFC 820 and the DC/DC converter 810. Here, the PWM control IC 800 may be disposed at a primary side of the power supply device and may include the FB terminal receiving a signal for adjusting a switching duty, an ON/OFF terminal receiving a signal for adjusting an ON/OFF operation of the PWM control IC 800, and a gate driver terminal outputting a signal for controlling switching of the DC/DC converter 810 and the PFC 820.

Figure 2:
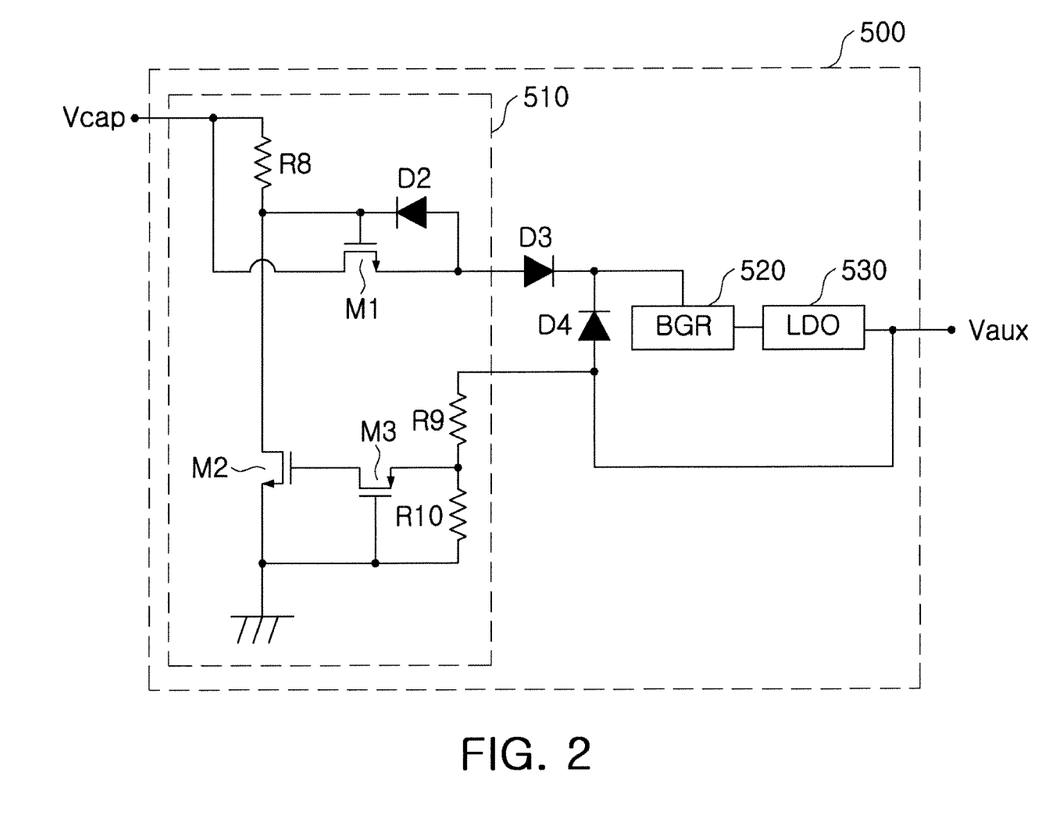
FIG. 2 is a detailed circuit diagram of a constant voltage circuit unit which can be used in a power supply device according to an embodiment of the present invention.

FIG. 2 is a detailed circuit diagram of the constant voltage circuit unit 500 which can be used in a power supply device according to an embodiment of the present invention.

Referring to FIG. 2, the constant voltage circuit unit 500 may include a band gap reference (BGR) circuit unit 520 generating a certain reference voltage from an output voltage of the power supply device, a low voltage drop regulator (or low drop out (LDO)) 530 generating a constant voltage upon receiving a reference voltage from the BGR circuit unit 520, and a voltage cutoff unit 510 cutting off an output voltage supplied to the BGR circuit unit 520 when the constant voltage is higher than a reference voltage.

When the output voltage is cut off, the voltage cutoff unit 510 may provide the constant voltage generated by the low voltage drop regulator 530 to the BGR circuit unit 520.

The voltage cutoff unit 510 may include an eighth resistor R8 having one end connected to the output terminal of the power supply device, a first n channel MOSFET M1 having a gate connected to the other end of the eighth resistor R8, a drain connected to one end of the eighth resistor R8, and a source connected to the BGR circuit unit 520, and a diode D2 having a cathode connected to the other end of the eighth resistor R8 and the gate of the first n channel MOSFET M1 and an anode connected to the BGR circuit unit 520 and the source of the first n channel MOSFET M1.

Also, the voltage cutoff unit 510 may include a second n channel MOSFET M2 having a drain connected the other end of the eighth resistor R8 and a source connected to a ground, a ninth resistor R9 and a tenth resistor R10 connected in series between the anode of the diode D2 and a ground, and a p channel MOSFET M3 having a drain connected to a gate of the second n channel MOSFET M2, a gate connected to a ground, and a source connected to a connection node of the ninth resistor R9 and the tenth resistor R10.

An output terminal of the low voltage drop regulator 530 may be connected to a connection node of the voltage cutoff unit 510 and the BGR circuit unit 520 to form a feedback loop. Also, in order to prevent a reverse current, a diode D3 having an anode connected to the anode of the diode D2 of the voltage cutoff unit 510 and a cathode connected to the BGR circuit unit 520 may be provided to a connection node of the voltage cutoff unit 510 and the BGR circuit unit 520.

Also, in order to cut off a forward current in the feedback loop, a diode D4 having an anode connected to a connection node of the output terminal of the low voltage drop regulator 530 and the ninth resistor R9 of the voltage cutoff unit 510 and a cathode connected to the cathode of the diode D3 may be provided.

FIG. 3 is a timing chart illustrating waveforms in each part of FIG. 1.

Figure 3A:
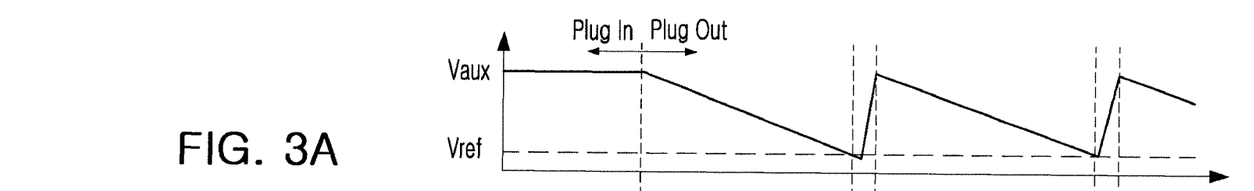
FIG. 3A to 3D are a timing chart illustrating waveforms in each part of FIG. 1.
Figure 3B:
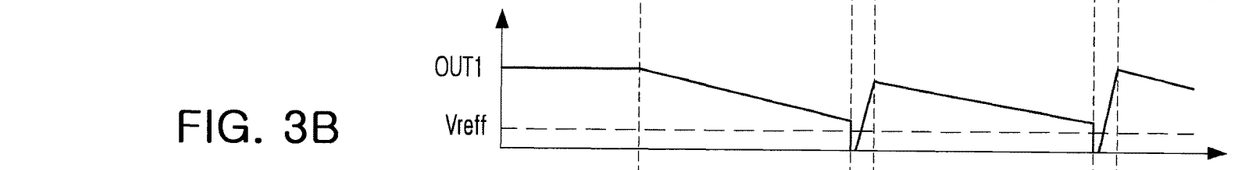

Referring to FIG. 3A is a waveform denoting a change in the voltage Vaux of the auxiliary capacitor C1 in FIGS. 1, and 3B is a waveform denoting a change in the voltage of a signal generated from the second controller 300, i.e., an output from the first comparator 310, in FIG. 1.

Figure 3C:
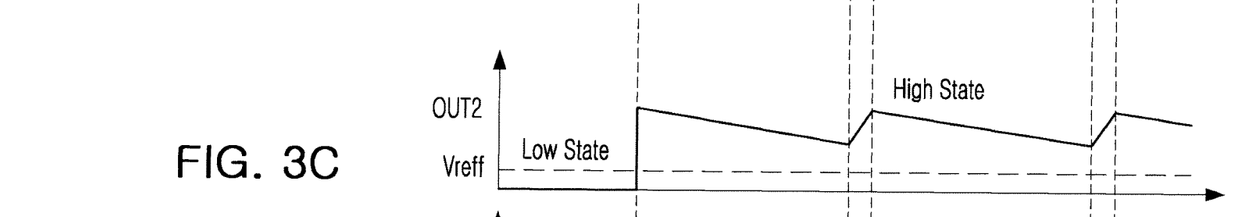

Also, in FIG. 3C is a waveform denoting a change in the voltage of a signal generated from the first controller 200, i.e., an output from the second comparator 210, in FIG. 1.

Figure 3D:
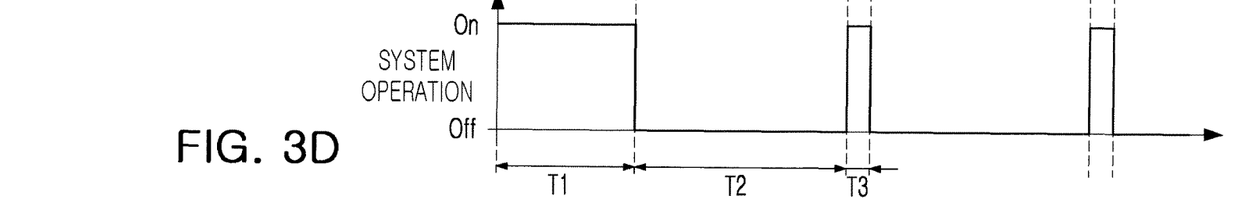

In FIG. 3D is a waveform denoting the operation of the PWM control IC 800 of FIG. 1, namely, the overall operation of the power supply device system. T1 is a section in which a load is connected to the output terminal, T2 is a section in which a load is not connected and the voltage Vaux of the auxiliary capacitor C1 is higher than the reference voltage value Vref, and T3 is a section in which a load is not connected and the voltage Vaux of the auxiliary capacitor C1 becomes lower than the reference voltage value Vref so the PWM control IC 800 is temporarily operated.

Figure 4:
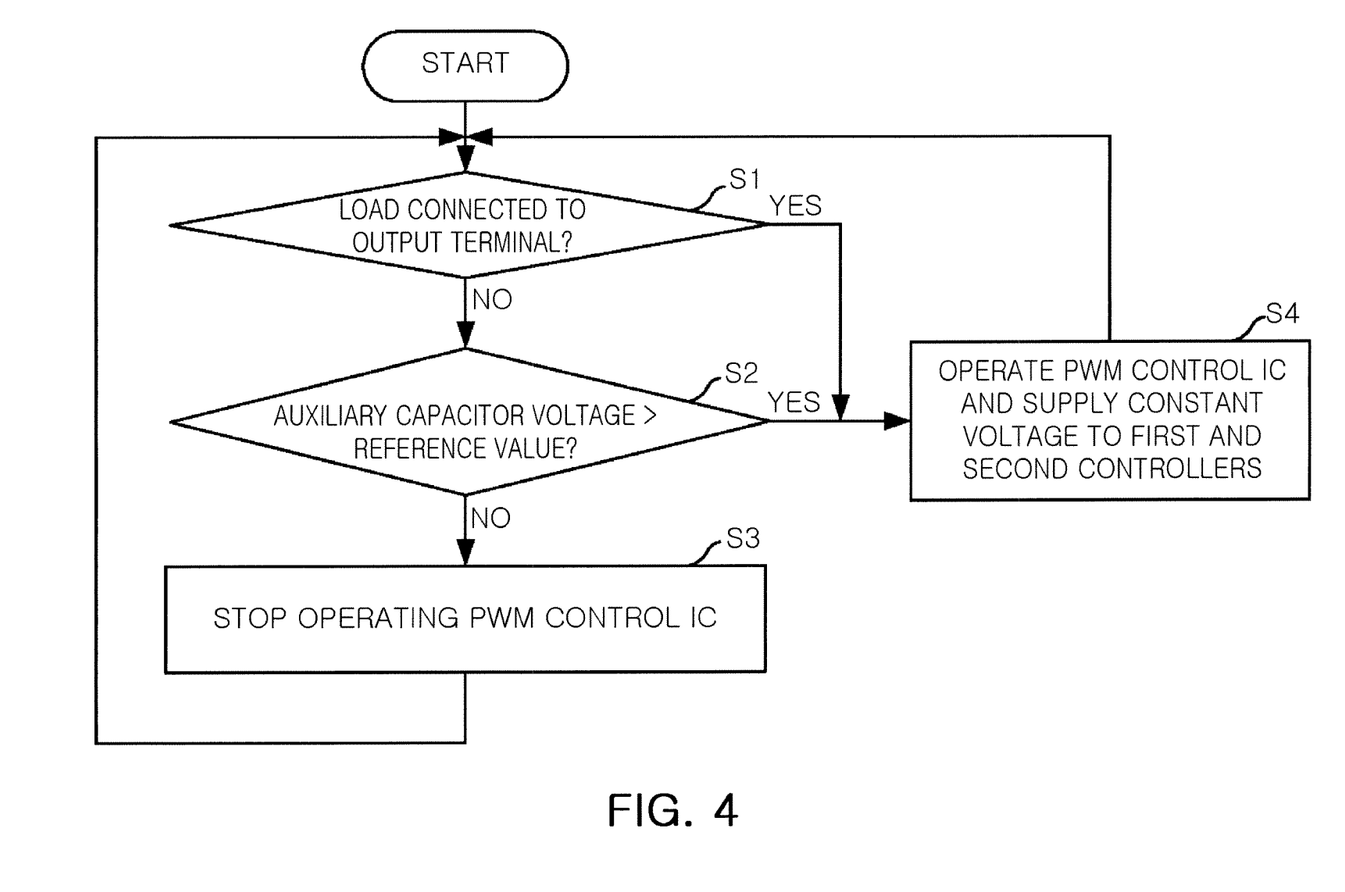
FIG. 4 is a flow chart illustrating a process of a method of controlling a power supply device according to an embodiment of the present invention.

FIG. 4 is a flow chart illustrating a process of a method of controlling a power supply device according to an embodiment of the present invention. Referring to FIG. 4, the method of controlling a power supply device may include operation S1 of determining whether or not a load is connected to the output terminal of the power supply device, operation S2 of determining whether or not the voltage of the auxiliary capacitor is higher than the reference voltage value Vref when a load is not connected to the output terminal, and operation S3 of stopping the operation of the PWM control IC when the voltage of the auxiliary capacitor is higher than the reference voltage value Vref.

Here, when it is determined that a load is connected to the output terminal of the power supply device or when it is determined that the voltage Vaux of the auxiliary capacitor is lower than the reference voltage Vref, operation S4 of operating the PWM control IC is performed.

Figure 5:
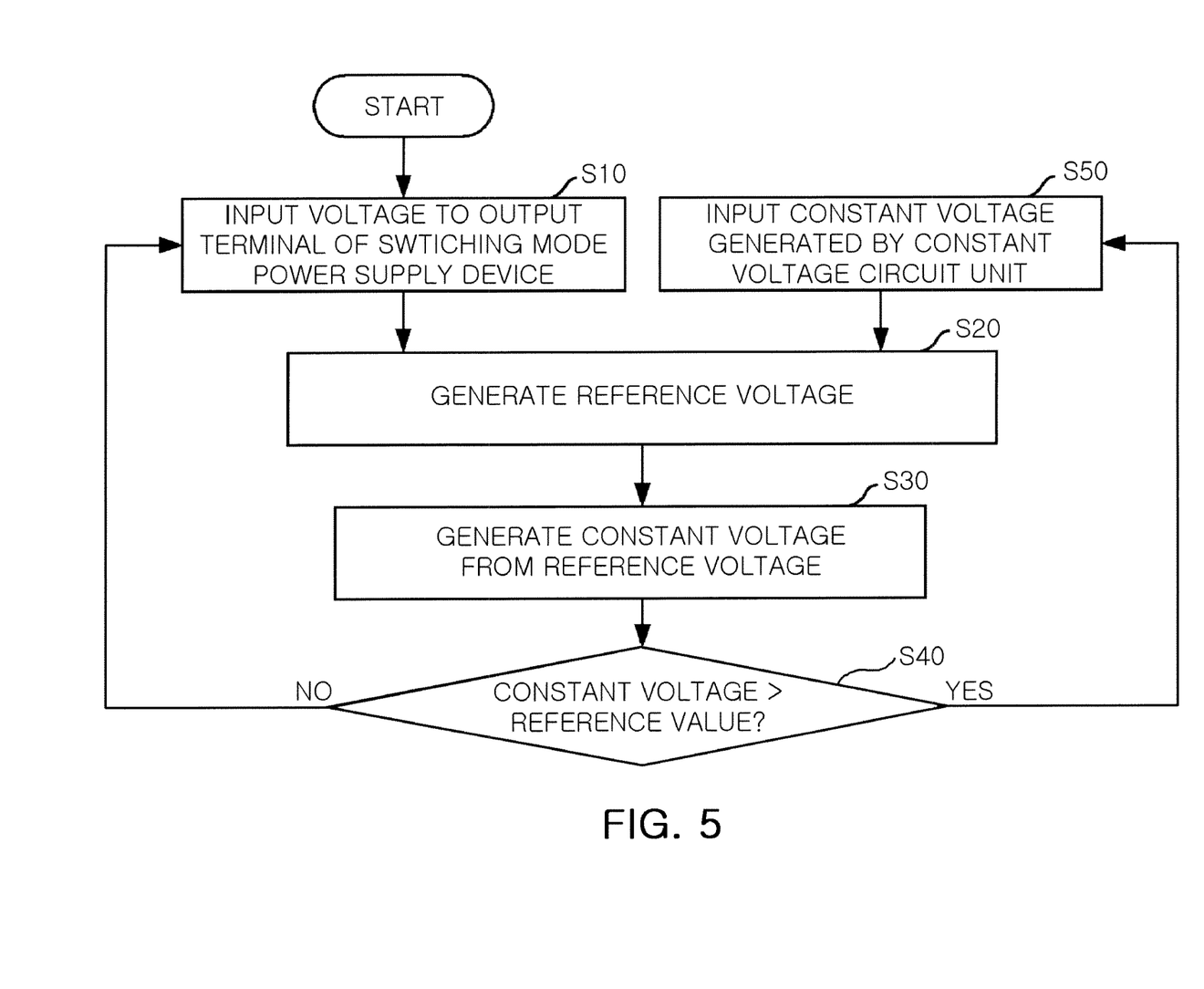
FIG. 5 is a flow chart illustrating an operation of a constant voltage circuit unit according to an embodiment of the present invention.

FIG. 5 is a flow chart illustrating an operation of the constant voltage circuit unit according to an embodiment of the present invention. Referring to FIG. 5, when the constant voltage circuit unit is initially driven, it receives the voltage of the output terminal of the power supply device (S10). The BGR circuit unit generates a reference voltage from this voltage (S20), and the constant voltage is generated by the low voltage drop regulator from the generated reference voltage (S30).

It is determined whether or not the constant voltage generated by the low voltage drop regulator is higher than the reference voltage (S40). When the constant voltage generated by the low voltage drop regulator is higher than the reference voltage, the constant voltage generated by the constant voltage circuit unit is input to the BGR circuit unit (S50).

Hereinafter, the operation of the power supply device according to an embodiment of the present invention will be described with reference to the accompanying drawings.

FIG. 1 is a detailed block diagram of a power supply device according to an embodiment of the present invention.

Referring to FIG. 1, the voltage detection unit 100 may detect a voltage that changes according to whether or not a load is connected to the output terminal of the power supply device, and provide the detected voltage to the first controller 200.

In more detail, the voltage detection unit 100 may include the first resistor R1 connected between the first controller 200 and the constant voltage circuit unit 500 and the second resistor R2 connected between the output terminal of the power supply device and a ground. Thus, when a load is not connected, a voltage divided by the first resistor R1 and the second resistor R2 is input to the first controller 200, and when a load is connected, a voltage divided by a synthetic resistor containing a resistance value of the load and a resistance value of the second resistor R2 and the first resistor R1 is input to the first controller 200.

The first controller 200 may include the third resistor R3, the fourth resistor R4, and the fifth resistor R5 connected in series between an output terminal of the constant voltage circuit unit 500 and a ground, and the second comparator 210 having the inversion terminal connected to the connection node of the fourth resistor R4 and the fifth resistor R5 and the non-inversion terminal receiving the voltage detected by the voltage detection unit 100. Here, the voltage input to the inversion terminal of the second comparator 210 is the voltage Vaux of the auxiliary capacitor C1 divided by a synthetic resistor of the third resistor R3 and the fourth resistor R4, and the fifth resistor R5.

In more detail, each resistance value is previously set such that the voltage input to the non-inversion terminal of the second comparator 210 is higher than the voltage detected in the voltage detection unit 100 when a load is connected, and the voltage input to the non-inversion terminal of the second comparator 210 is lower than the voltage detected in the voltage detection unit 100 when a load is not connected. Thus, when a load is connected, the output of the second comparator 210 has a voltage level lower (L) than the per-set voltage value Vreff, and when a load is not connected, the output of the second comparator 210 has a voltage level higher (H) than the pre-set voltage value Vreff. Here, the low (L) output is input to the ON/OFF terminal of the PWM control IC 800 through the first photocoupler of the first signal transmission unit 600 to operate the PWM control IC 800.

In case in which a load is not connected to the output terminal, when the voltage Vaux of the auxiliary capacitor C1 becomes lower than the reference voltage value Vref, the second controller 300 may operate the PWM control IC 800. The second controller 300 shares the fourth resistor R4 and the fifth resistor R5 with the first controller 200, and includes the first comparator 310 having the non-inversion terminal receiving the voltage Vaux of the auxiliary capacitor C1 divided by the synthetic resistor of the fourth resistor R4 and the fifth resistor R5 and third resistor R3 and the inversion terminal receiving a certain reference voltage Vref. Here, the reference voltage Vref input to the inversion terminal is set to be sufficiently lower than a maximum charge voltage of the auxiliary capacitor C1.

Thus, when a load is not connected so the PWM control IC 800 is not operated, the voltage Vaux of the auxiliary capacitor C1 is gradually reduced with the lapse of time, and at the point in time that the voltage Vaux becomes lower than the reference voltage Vref input to the inversion terminal, the output of the comparator becomes lower (L) than the pre-set voltage value Vreff. Here, the low (L) output is input to the ON/OFF terminal of the PWM control IC 800 through the first photocoupler of the first signal transmission unit 600 to operate the PWM control IC 800.

Namely, when a load is not connected to the output terminal of the power supply device, the second controller 300 monitors the voltage Vaux of the auxiliary capacitor C1, and only when the voltage Vaux of the auxiliary capacitor C1 drops to be lower than the reference voltage value Vref, is the PWM control IC 800 driven, thus significantly reducing power consumption.

When a load is connected to the output terminal of the power supply device, the third controller 400 transfers a feedback signal to the PWM control IC 800 in order to uniformly maintain the output voltage. The sixth resistor R6 of the third controller 400 divides the voltage of the output terminal of the power supply device. When the output voltage is unintentionally increased, the divided resistance value is increased. Then, the shunt regulator 410 is operated to transfer a signal to the FB terminal of the PWM control IC 800 through the second signal transmission unit 700, thus reducing a PWM duty.

Through such an operation, the third controller 400 can eliminate an unintentional change in the output voltage, and thus, a stable voltage can be supplied to the load.

The first controller 200, the second controller 300, and the constant voltage circuit unit 500 may constitute a single control IC 1000. The control IC 1000 may further include the shunt regulator 410 of the third controller 400. In this case, a leakage current can be reduced to further reduce power consumption, compared with the case in which the respective elements are distributed to be disposed.

Referring to FIG. 2, the constant voltage circuit unit 500 may include the voltage cutoff unit 510, the BGR circuit unit 520, and the low voltage drop regulator 530.

The constant voltage circuit unit 500 generates a uniform voltage from the output voltage of the power supply device and supplies the generated voltage to the auxiliary capacitor C1, the first controller 200, and the second controller 300. When a voltage generated by the low voltage drop regulator 530 is higher than a reference voltage value, the voltage cutoff unit 510 of the constant voltage circuit unit 500 prevents the output voltage of the power supply device from being input to the BGR circuit unit 520.

The operation of the voltage cutoff unit 510 will now be described in more detail. Ina case of initial driving during which the output voltage of the low voltage drop regulator 530 is lower than the reference voltage value, the first n channel MOSFET M1 is turned on, the second n channel MOSFET M2 is turned off, and the p channel MOSFET M3 is turned off. Accordingly, the voltage of the output terminal of the power supply device is input to the BGR circuit unit 520, and the low voltage drop regulator 530 generates a constant voltage from the reference voltage generated by the BGR circuit unit 520.

Thereafter, when the voltage generated by the low voltage drop regulator 530 is higher than the reference voltage value, the source voltage of the p channel MOSFET M3 is increased to be turned on, so the second n channel MOSFET M2 is turned on. At this time, the voltage of the output terminal is bypassed through the second n channel MOSFET M2 and the first n channel MOSFET M1 is turned off. Accordingly, the output voltage of the power supply device is prevented from being input to the BGR circuit unit 520, and the voltage generated by the low voltage drop regulator 530 is input to the BGR circuit unit 520.

Through such an operation in the constant voltage circuit unit 500, switching noise inevitably generated when the power supply device operates may be prevented from being introduced into the first controller 200, or the like.

FIG. 3A to 3D are a timing chart illustrating waveforms in each part of FIG. 1.

Referring to FIGS. 1 and 3A to 3D, the section T1 indicates a state in which a load is connected to the output terminal of the power supply device. In this section, referring to FIG. 3C, the output OUT2 of the first controller 200 is lower (L) than the pre-set voltage value Vreff. Thus, referring to FIG. 3B, the PWM control IC 800 is operated regardless of the output OUT1 of the second controller 300, so the power supply device is in an ON state. At this time, the auxiliary capacitor C1 is maintained in a charged state.

A load is connected to the output terminal of the power supply device, starting from section T2.

In the section T2, referring to FIG. 3A, the power supply device does not operate, so it is noted that the voltage Vaux of the auxiliary capacitor C1 is gradually reduced. Also, in this section, referring to FIG. 3C, the output OUT2 of the first controller 200 has a voltage level higher (H) than the pre-set voltage value Vreff, and referring to FIG. 3B and FIG. 3D, the output OUT1 of the second controller 300 also has a voltage level higher (H) than the pre-set voltage value Vreff, so the PWM control IC 800 is not operated and the system operation is in an OFF state.

In the section T3, the system is temporarily operated in a state in which a load is not connected to the power supply device. Referring to FIG. 3A to 3D, the voltage Vaux of the auxiliary capacitor C1 is reduced, and at the point in time that the voltage Vaux becomes lower than the reference voltage value Vref input to the inversion input terminal of the first comparator 310, the output OUT1 of the second controller 300 has a low (L) voltage level, so the PWM control IC 800 is operated to turn on the system.

After the section T3, the foregoing operations of the sections T2 and T3 are repeatedly performed. Thus, when a load is not connected to the output terminal of the power supply device, the PWM control IC 800 is operated only for a short time during which the auxiliary capacitor C1 is charged, and most of the time, the operation of the PWM control IC 800 is stopped, thus preventing the system from being operated. Through such operation controlling, power consumption can be considerably reduced when a load is not connected to the power supply device, compared with the related art.

As described above, according to embodiments of the present invention, power consumption can be greatly reduced when a load is not connected to the output terminal of the power supply device. Also, since the elements for controlling the power supply device are implemented as a single IC, a leakage current can be reduced to significantly reduce power consumption. In addition, voltage can be supplied to the IC, while reducing switching noise.

As set forth above, according to embodiments of the present invention, power consumption can be considerably reduced when a load is not connected to the output terminal of the power supply device. Also, since elements for controlling the power supply device are implemented as a single integrated circuit (IC), a leakage current can be reduced to thus significantly reduce power consumption. In addition, voltage can be supplied to the IC while reducing switching noise.

While the present invention has been shown and described in connection with the embodiments, it will be apparent to those skilled in the art that modifications and variations can be made without departing from the spirit and scope of the invention as defined by the appended claims.

What is claimed is:

1. A power supply device comprising:
    a first controller operating a pulse width modulation (PWM) control integrated circuit (IC) when a load is connected to an output terminal of the power supply device;
    a second controller determining whether to operate the PWM control IC according to a change in voltage of an auxiliary capacitor connected to the first controller when the load is not connected to the output terminal; and,
    a constant voltage circuit unit generating a constant voltage from a voltage of the output terminal of the power supply device, and supplying the constant voltage to the first controller and the second controller when the PWM control IC operates,
    wherein when the constant voltage generated by the constant voltage circuit unit from the voltage of the output terminal of the power supply device is higher than a reference voltage value, the voltage of the output terminal of the power supply device supplied to the constant voltage circuit unit is cut off.

2. The device of claim 1, wherein the constant voltage circuit unit includes:
    a band gap reference circuit unit generating a reference voltage from the voltage of the output terminal;
    a low voltage drop regulator generating a constant voltage upon receiving the reference voltage from the band gap reference circuit unit; and
    a voltage cutoff unit cutting off voltage of the output terminal supplied to the band gap reference circuit unit when the constant voltage is higher than the reference voltage value.

3. The device of claim 2, wherein when the voltage of the output terminal is cut off, the voltage cutoff unit provides the constant voltage generated by the low voltage drop regulator to the band gap reference circuit unit.

4. The device of claim 1, further comprising a third controller controlling the PWM control IC such that the voltage of the output terminal is uniformly maintained when the load is connected to the output terminal.

5. The device of claim 1, wherein when the voltage of the auxiliary capacitor becomes lower than the reference voltage value, the second controller operates the PWM control IC.

6. The device of claim 1, further comprising a voltage detection unit detecting a voltage changing according to whether or not the load is connected to the output terminal, and providing the detected voltage to the first controller.

7. The device of claim 6, wherein the voltage detection unit includes:
    a first resistor connected between the first controller and the constant voltage circuit unit; and
    a second resistor connected between the output terminal and a ground.

8. The device of claim 6, wherein the first controller includes:
    a third resistor, a fourth resistor, and a fifth resistor connected in series between the output terminal of the constant voltage circuit unit and the load; and
    a second comparator having an inversion terminal connected to a connection node of the fourth resistor and the fifth resistor and a non-inversion terminal connected to the voltage detection unit.

9. The device of claim 8, wherein the second controller includes a first comparator having a non-inversion terminal connected to a connection node of the third resistor and the fourth resistor and an inversion terminal receiving a reference voltage.

10. The device of claim 2, wherein the voltage cutoff unit includes:
    an eighth resistor having one end connected to the output terminal of the power supply device;
    a first n channel metal oxide semiconductor field effect transistor (MOSFET) having a gate connected to the other end of the eighth resistor, a drain connected to one end of the eighth resistor, and a source connected to the band gap reference circuit unit;
a first diode having a cathode connected to the other end of the eighth resistor and the gate of the first n channel MOSFET, and an anode connected to the band gap reference circuit unit and the source of the first n channel MOSFET;
a second n channel MOSFET having a drain connected to the other end of the eighth resistor and a source connected to the load;
a ninth resistor and a tenth resistor connected in series between the anode of the first diode and the load; and
a p channel MOSFET having a drain connected to a gate of the second n channel MOSFET, a gate connected to the load, and a source connected to a connection node of the ninth resistor and the tenth resistor.

11. A control integrated circuit (IC) comprising:
a first controller outputting a low signal when a load is connected to an output terminal of a power supply device;
a second controller outputting a low signal lower than a pre-set voltage value when the voltage of an auxiliary capacitor connected to the first controller becomes lower than the reference voltage value when the load is not connected to the output terminal of the power supply device; and
a constant voltage circuit unit generating a constant voltage from a voltage at the output terminal of the power supply device, and supplying the constant voltage to the first controller and the second controller,
wherein when any one of an output from the first controller and an output from the second controller is a low signal, a pulse width modulation (PWM) control IC is operated,
wherein when the constant voltage generated by the constant voltage circuit unit from the voltage of the output terminal of the power supply device is higher than a reference voltage value, the voltage of the output terminal of the power supply device supplied to the constant voltage circuit unit is cut off.

12. The circuit of claim 11, wherein the constant voltage circuit unit includes:
a band gap reference circuit unit generating a reference voltage from the voltage of the output terminal;
a low voltage drop regulator generating a constant voltage upon receiving the reference voltage from the band gap reference circuit unit; and
a voltage cutoff unit cutting off the voltage of the output terminal supplied to the band gap reference circuit unit when the constant voltage is higher than the reference voltage value.

13. The circuit of claim 12, wherein when the voltage of the output terminal is cut off, the voltage cutoff unit provides the constant voltage generated by the low voltage drop regulator to the band gap reference circuit unit.

14. A method of controlling a power supply device, the method comprising:
determining whether or not a load is connected to an output terminal of the power supply device;
operating, by a first controller, a pulse width modulation (PWM) control integrated circuit (IC) when the load is connected to the output terminal;
determining, by a second controller, whether to operate the PWM control IC according to a change in voltage of an auxiliary capacitor connected to the first controller when the load is not connected to the output terminal; and
supplying a constant voltage to the first controller and the second controller through a constant voltage circuit unit when the PWM control IC is operated,
wherein, in the supplying of the constant voltage, when the constant voltage generated from a voltage of the output terminal of the power supply device is higher than a reference voltage value, the voltage of the output terminal is cut off.

15. The method of claim 14, wherein the supplying of the constant voltage includes:
generating a reference voltage from the voltage of the output terminal;
generating a constant voltage upon receiving the reference voltage; and
cutting off the voltage of the output terminal when the generated constant voltage is higher than the reference voltage value.

16. The method of claim 15, wherein when the voltage of the output terminal is cut off, the reference voltage is generated from the constant voltage.

17. The method of claim 14, wherein, in the determining, by the second controller, of whether to operate the PWM control IC, when the voltage of the auxiliary capacitor becomes lower than the reference voltage value, the second controller operates the PWM control IC.

* * * * *